United States Patent
Spearing

(10) Patent No.: US 9,103,728 B2
(45) Date of Patent: Aug. 11, 2015

(54) SYSTEM AND METHOD OF A PERSONAL ENHANCING COLOR SELECTION

(71) Applicant: Thia Spearing, Yakima, WA (US)

(72) Inventor: Thia Spearing, Yakima, WA (US)

( * ) Notice: Subject to any disclaimer, the term of this patent is extended or adjusted under 35 U.S.C. 154(b) by 0 days.

(21) Appl. No.: 13/913,404

(22) Filed: Jun. 8, 2013

(65) Prior Publication Data
US 2014/0362379 A1   Dec. 11, 2014

(51) Int. Cl.
*G01J 3/46* (2006.01)

(52) U.S. Cl.
CPC ........................................ *G01J 3/463* (2013.01)

(58) Field of Classification Search
USPC ................................................. 356/402–425
See application file for complete search history.

(56) References Cited

U.S. PATENT DOCUMENTS

| 4,681,546 A | 7/1987 | Hart |
| 4,909,632 A | 3/1990 | Simpson |
| 5,313,267 A | 5/1994 | MacFarlane et al. |
| 2005/0025728 A1* | 2/2005 | De Rigal et al. ................ 424/63 |

* cited by examiner

*Primary Examiner* — Abdullahi Nur
(74) *Attorney, Agent, or Firm* — Svendsen Legal, LLC.

(57) ABSTRACT

A personal enhancing color selection system and method, in which a selected reflective material, preferably in the form of a fabric or woven drape, is placed near the face or skin surface of a subject person. The selected reflective material has a metallic sheen when reflecting an ambient light source. The selected reflective fabric material is either a silver-hued material, a copper-hued material, or a gold-hued material. The incident light from the ambient light source imparts a reflected light onto the skin surface, with the copper material imparting a copper toned reflected light, the silver-hued material imparting silver toned reflected light, and the gold material imparting a gold toned reflected light. A visual determination of an aesthetically appealing augmentation to the skin surface is made, to recommend haircoloring, clothing colors and makeup selections that will likewise produce a positively enhanced appearance of the subject person of the color analysis.

12 Claims, 2 Drawing Sheets

SYSTEM AND METHOD OF A PERSONAL ENHANCING COLOR SELECTION

TECHNICAL FIELD

This invention pertains to a personal enhancing color selection. More specifically, the invention relates to a system and method of utilizing metallic hued reflected light, in a skin pigment based categorization system, for use as a color recommendation consultation tool in the selection of personal hair colors, makeup colors, and clothing colors.

BACKGROUND OF THE INVENTION

Conventional consultation systems used for personal color analysis are based on the direct measurement and categorization of skin tones, typically within a two-variable color matrix that utilizes the spectrum of visible light with two tone range from yellow to blue. A problem of these prior systems is that determining the color of the skin is simply the same process as mixing paint from a chip or swatch, in that the true need of how the skin can be best enhanced remains unresolved or un determined. A system for skin tone determination is needed that views skin in the way that it is observed by others, not how it appears to a clinician who is simply matching for a cover-up.

The following is a disclosure of the present invention that will be understood by reference to the following detailed description taken in conjunction with the accompanying drawings.

Figure 1:
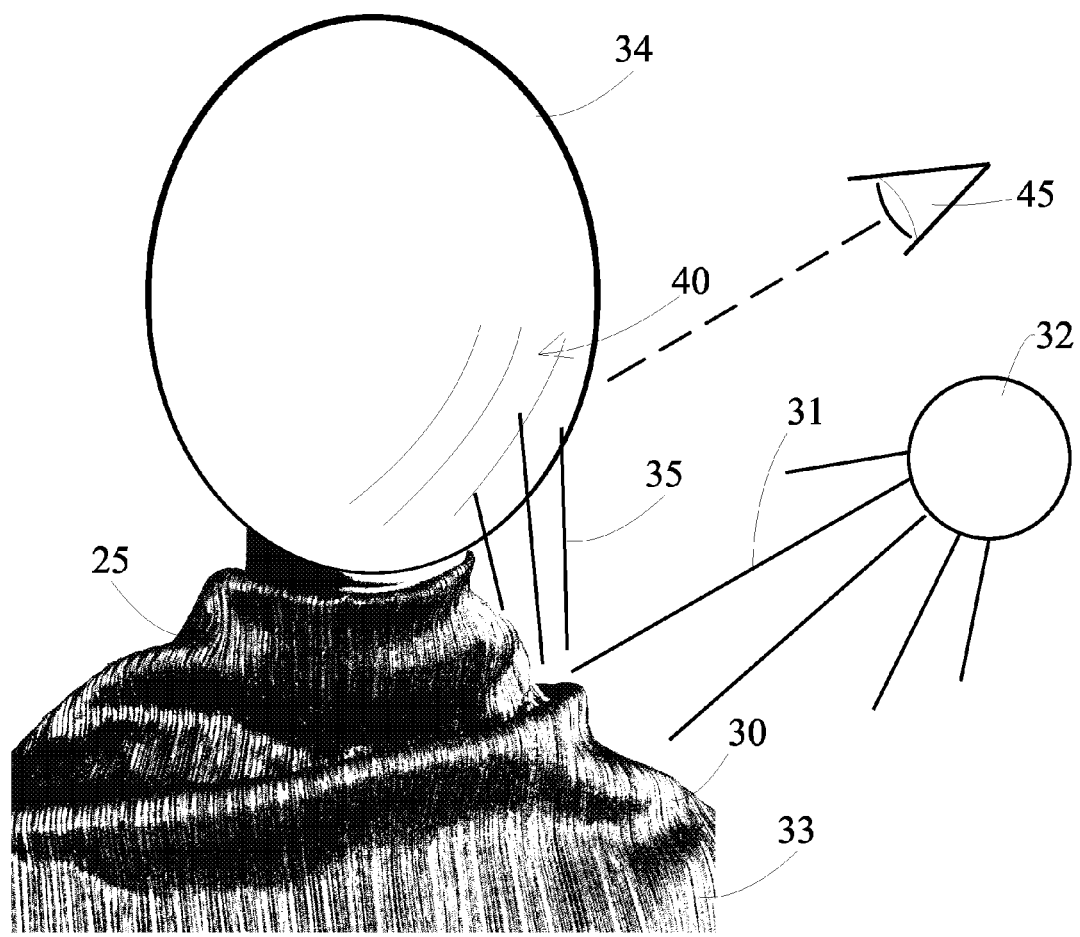
FIG. 1 is a schematic view of a system and method for a personal enhancing color selection, according to an embodiment of the invention.

Reference characters included in the above drawings indicate corresponding parts throughout the several views, as discussed herein. The description herein illustrates one preferred embodiment of the invention, in one form, and the description herein is not to be construed as limiting the scope of the invention in any manner. It should be understood that the above listed figures are not necessarily to scale and may include fragmentary views, graphic symbols, diagrammatic or schematic representations, and phantom lines. Details that are not necessary for an understanding of the present invention by one skilled in the technology of the invention, or render other details difficult to perceive, may have been omitted.

DETAILED DESCRIPTION OF SPECIFIC EMBODIMENTS

The present invention provides a system and method for a personal enhancing color selection. FIGS. 1 through 4C show features of a preferred embodiment of the personal enhancing color selection, which can be referred to simply herein as the "color selection," the color selection system and method 15 of the present invention having a valuable use as a consultation tool, to match a person's skin complexion with flattering hair color, makeup colors, and clothing colors.

Figure 2A:
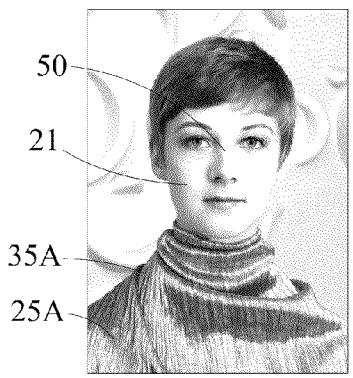
FIG. 2A shows a color analysis subject having a Cool skin tone and wearing a color analysis drape of a silver-hued material, according to the system and method of the present invention.
Figure 2B:
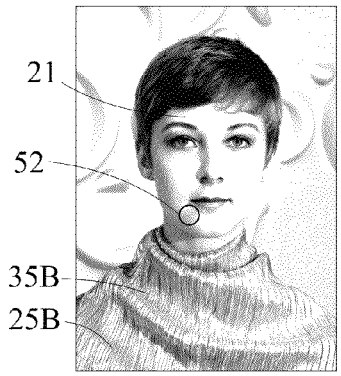
FIG. 2B shows a color analysis subject having a Cool skin tone and wearing a color analysis drape of a copper-hued material, according to the system and method of the present invention.
Figure 2C:
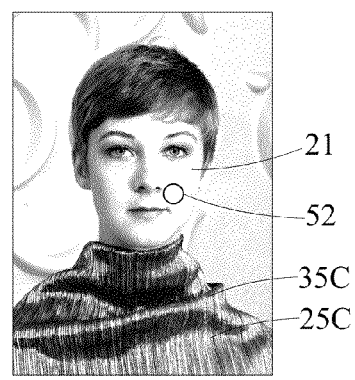
FIG. 2C shows a color analysis subject having a Cool skin tone and wearing a color analysis drape of a gold-hued material, according to the system and method of the present invention.
Figure 3A:
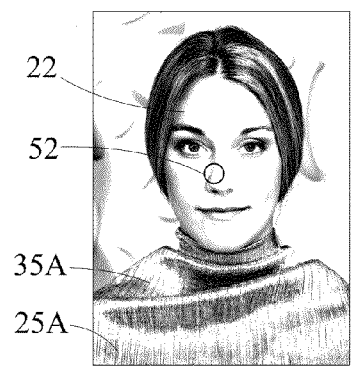
FIG. 3A shows a color analysis subject having a Rosy skin tone and wearing a color analysis drape of a silver-hued material, according to the system and method of the present invention.
Figure 3B:
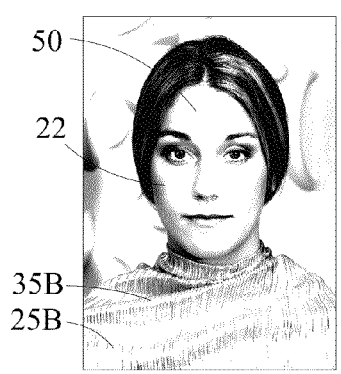
FIG. 3B shows a color analysis subject having a Rosy skin tone and wearing a color analysis drape of a copper-hued material, according to the system and method of the present invention.
Figure 3C:
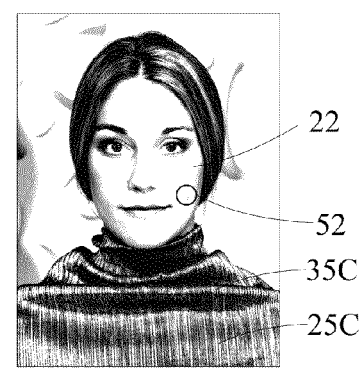
FIG. 3C shows a color analysis subject having a Rosy skin tone and wearing a color analysis drape of a gold-hued material, according to the system and method of the present invention.
Figure 4A:
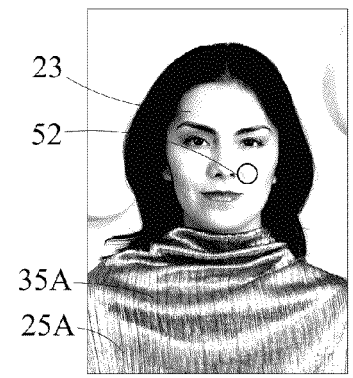
FIG. 4A shows a color analysis subject having a Warm skin tone and wearing a color analysis drape of a silver-hued material, according to the system and method of the present invention.
Figure 4B:
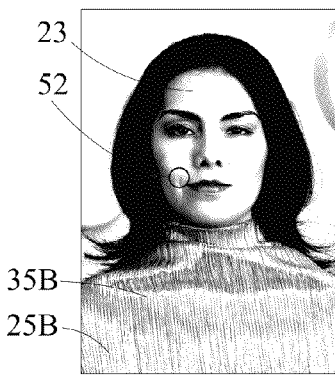
FIG. 4B shows a color analysis subject having a Warm skin tone and wearing a color analysis drape of a copper-hued material, according to the system and method of the present invention.
Figure 4C:
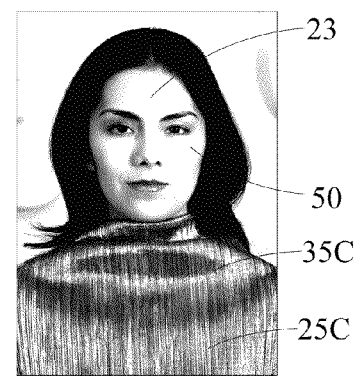
FIG. 4C shows a color analysis subject having a Warm skin tone and wearing a color analysis drape of a gold-hued material, according to the system and method of the present invention.

The color selection system and method 15 utilizes a pigment based categorization system that employs scientific and artistic principles, which considers three primary colors; blue, red, and yellow as primary foundations for perceived colors. These primary colors are a set of colors that can be combined to make a useful range of colors. For human eyes, three primary colors are usually used, since human color vision is trichromatic. The three colors that fall within each of the sensitivity ranges of each of the human eye are blue, red and yellow, which can be combined and mixed to form skin pigments. Combinations of these three primary colors provide a tonal range when considering the observed appearance of a skin tone 20 to the eye. Relating these three primary colors to pigments that contribute to human coloration, it is known that the skin's melanin pigments of eumelanin and pheomelanin can be mixed into three basic categories the human skin tones, including: 'Cool'—a predominantly eumelanin based coloration; 'Rosy'—a predominantly pheomelanin based coloration; or 'Warm'—with an approximately visually equivalent mixture of both pheomelanin and eumelanin melanin based colorations. FIGS. 2A, 2B and 2C illustrate a person having a Cool skin tone 21; FIGS. 3A, 3B and 3C illustrate a person having a Rosy skin tone 22; and FIGS. 4A, 4B and 4C illustrate a person having a Warm skin tone 23.

For the color selection system and method 15, a selected reflective material 25 is placed proximate to a skin surface 29, as shown FIGS. 2A through 4C. The selected reflective material has a metallic sheen 30 when reflecting an incident light 31 from an ambient light source 32. The selected reflective material is most preferably, either a silver-hued material 25A, a copper-hued material 25B, or a gold-hued material 25C. These selected reflective materials can be referred to as a color analysis drape 33, in that they are preferably laid loosely across the upper body, in the front of a color analysis subject 34, as generically shown in FIG. 1.

The metallic surface of the color analysis drape 33 reflects the incident light 31 from an ambient light source 32 as a reflected incident light 35 in its corresponding tone, most preferably onto the face 36 of the color analysis subject. However, in a more general alternative, this reflected incident light could be cast upon any skin surface 40 of the color analysis subject 34.

Most preferably, the color analysis drape 33 is placed around the neck 37 and close to the face 36 of the color analysis subject for a visual determination 45 of changes in the shadows, highlights, and smoothness of the complexion that occur due to the reflected incident light upon the viewed skin surface 40. By alternating the selected reflective material 25 between the silver-hued material 25A, the copper-hued material 25B, and the gold-hued material 25C, an aesthetically appealing augmentation 50 can be observed in the visual determination for one of the selected reflective materials.

Specifically, the composition of the selected reflective material 25 for use as the color analysis drape 33 can be any metallic appearing material, and can be a fabric, a paper, a plastic or a metal. Additionally this selected reflective material may be in the form of a sheet, a coating, a foil, a woven mat or fabric, or any such material that suits the reflective requirements of the invention, as having a slightly metallic finish and reflective qualities.

The color of the reflected incident light 35 is directly related to the selected reflective material 25. Specifically, the color analysis drape made of the silver-hued material 25A reflects a silver-toned reflected light or 'Cool Light' 35A, the color analysis drape made of the copper-hued material 25B reflects a copper-toned reflected light or 'Rosy Light' 35B, and the color analysis drape made of the gold-hued material 25C reflects a gold-toned reflected light or 'Warm Light' 35C.

For the present invention, adequate lighting is imperative to a visual determination 45 of the personal enhancing color selection 15. The incident light 31 must be bright enough to provide adequate reflected incident light 35 to illuminate the skin surface 40 of the color analysis subject 34, without casting any influence or adding colors to the skin surface. Preferably, the incident light is an ambient light source 32, most preferably from an un-tinted window, which allows unfiltered daylight to illuminate the face. Alternatively, and especially when daylight is waning, hazy or otherwise tinted, a light fixture can be employed that provides illumination similar to standard daylight. A recommended 'color temperature' for the ambient light source is between 6500K and 5100K. "CIE Standard Illuminant D65" (sometimes simply written as "D65") is a commonly-used standard illumination, as defined by the International Commission on Illumination (CIE), which is part of the "D" series of illumination specification that attempt to provide an international standard for illumination conditions in the open-air. D65 approximates the illumination of the midday-sun in mid-northern latitudes, and hence it is also called a "daylight illuminant." As any standard illuminant is represented as a table of averaged spectrophotometric data, and any light source that has the same relative 'spectral power distribution' (SPD) can be considered a D65 light source. For use with the present invention, daylight balanced high-output fluorescent bulbs that produce 3400 watts of soft white light are an adequate light source that yields 5100K lighting temperature, with a color temperature that corresponds to noon daylight, is generally adequate. This lighting specification serves as the ambient light source to provide the desired strength and quality of incident light to properly illuminate the selected reflective material, and generate the needed reflected incident light upon the skin surface of the color analysis subject, without adding any undesirable extraneous color influences.

The aesthetically appealing augmentation 50 is a visual determination 45 of attractive and desirable changes skin surface 40 of the color analysis subject 34, including changes in the shadows, highlights, and smoothness of the complexion of the skin, all due to the reflected incident light 35 on the skin surface. Specifically, a color analysis subject having a Cool skin tone 21 will exhibit an aesthetically appealing augmentation though visual determination with the color analysis drape of the silver-hued material 25A, as it reflects a silver-toned reflected light or 'Cool Light' 35A. Likewise, a color analysis subject having the Rosy skin tone 22 will exhibit an aesthetically appealing augmentation though visual determination with the color analysis drape of the copper-hued material 25B, as it reflects a copper-toned reflected light or 'Rosy Light' 35B. Alternatively, a color analysis subject having the Warm skin tone 23 will exhibit an aesthetically appealing augmentation though visual determination with the color analysis drape of the gold-hued material 25C, as it reflects a gold-toned reflected light or 'Warm Light' 35C.

As noted above in the Description of the Drawings, the drawing series of FIGS. 2A, 2B and 2C illustrate a color analysis subject having a Cool skin tone 21; with the drawing series of FIGS. 3A, 3B and 3C illustrating a color analysis subject 34 having a Rosy skin tone 22; and the drawing series of FIGS. 4A, 4B and 4C illustrating a color analysis subject having a Warm skin tone 23. A silver-hued material 25A is employed as the color analysis drape 33 in FIGS. 2A, 3A and 4A. A copper-hued material 25B is employed as the color analysis drape in FIGS. 2B, 3B, and 4B. To complete the series, gold-hued material 25C is employed as the color analysis drape in FIGS. 2C, 3C, and 4C.

For the color analysis subject 34 with the Cool skin tone 21, it can be seen from the drawing series shown in FIGS. 2A, 2B and 2C, that FIG. 2A with the color analysis drape 33 of the silver-hued material exhibits the most aesthetically appealing augmentation by action of the Cool Light 35A reflected onto the face 36 of the color analysis subject.

Likewise, for the color analysis subject 34 with the Rosy skin tone 22, it can be seen from the drawing series shown in FIGS. 3A, 3B and 3C, that FIG. 3B with the color analysis drape 33 of the copper-hued material 25B exhibits the most aesthetically appealing augmentation by action of the Rosy Light 35B reflected onto the face 36 of the color analysis subject.

To complete the series for the color analysis subject 34 with the Warm skin tone 23, it can be seen from the third drawing series, shown in FIGS. 2A, 2B and 2C, that FIG. 4C with the color analysis drape 33 of the gold-hued material 25C exhibits the most aesthetically appealing augmentation by action of the Warm Light 35C reflected onto the face 36 of the color analysis subject.

To explain these results, it is believed that the reflected incident light 35 induces visually observable changes in the shadows, highlights, and smoothness of the skin complexion that occur due to the reflected incident light upon the viewed skin surface 40. The science of 'color subtraction' is detailed by Joseph Albers, in his well-known book, The Interaction of Color helps to explain this phenomenon. Through the color subtractive interaction by the skin surface 40 with the reflected incident light 35, it is supposed that small features of the skin surface, as well as shadows, highlights and blemishes are masked, while the natural glow of the skin surface is augmented.

Essentially, through the color selection system and method 15 of the present invention, an observer can make the visual determination 45 of which of the three possible pigment hues is most dominant in the observer; whether eumelanin, pheomelanin or the mixture of these different melanin is the predominant skin coloration. Upon making this determination, the technical person practicing the present invention is able to consult or recommend the most flattering hair color, makeup, and clothing colors to the color analysis subject 34, based upon whether they have a predominantly Cool skin tone 21, a Rosy skin tone 22, or a Warm skin tone 23. Upon making this determination, the technical person is able to recommend the most flattering hair color, makeup, clothing colors, to provide fundamental guidance in the selection of hair colors, makeup colors and clothing colors.

With the color selection system and method 15 the selected reflected incident light 35 casts an influence over the skin surface 40 of the color analysis subject 34, whose appearance changes depending on the interaction between the reflected incident light and their skin tone 20, to appear either smoother, neutral to no effect, or more shadowed and uneven. The color analysis drape 33 that produces the greatest smoothing effect is the dominant pigment skin tone of the subject. Relating the dominant pigment skin tone to a recommendation in terms of haircoloring, clothing colors and makeup selections will produce an aesthetic appealing augmentation 50 in a positively enhanced appearance of the color analysis subject.

The correctly selected color analysis drape 33 creates a smoothing effect, where the complexion of the skin surface 40 appears unified and even. An incorrectly selected color analysis drape will likely cause the visual appearance of the color analysis subject 34 to become disjointed with an un-appealing effect 52, such as high cheek coloration, and possibly greenish or grey shadows under the lips, eyes, or at the corners of the mouth and nose. FIGS. 2B, 2C, 3A, 3C, 4A, and 4B show these un-appealing effects for an incorrectly selected color analysis drape, in contrast to the aesthetically appealing augmentation 50 shown in FIGS. 2A, 3B, and 4C, for the Cool skin tone 21, Rosy skin tone 22, or Warm skin tone 23, respectively.

Of note, the terms "proximate to" or "approximately" are employed herein throughout, including this detailed description and the attached claims, with the understanding that is denotes a level of exactitude or equivalence in amount or location commensurate with the skill and precision typical for the particular field of endeavor, as applicable.

Additionally, in compliance with the statutes, the invention has been described in language more or less specific as to elemental features, process and method steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

The invention claimed is:

1. A personal enhancing color selection system comprising:
   a selected reflective material placed proximate to a skin surface, the selected reflective material having a metallic sheen when reflecting an ambient light source, the selected reflective fabric material selected from a group consisting of a silver-hued material, a copper-hued material, and a gold-hued material;
   an incident light from the ambient light source imparts a reflected incident light toward the skin surface, with the copper material imparting a copper toned reflected light, the silver-hued material imparting silver toned reflected light, and the gold material imparting a gold toned reflected light; and
   a visual determination of an aesthetically appealing augmentation to the skin surface resulting from the incident reflected light upon the skin surface from the selected reflective fabric.

2. The personal enhancing color selection system of claim 1, wherein the skin surface is a facial skin surface.

3. The personal enhancing color selection system of claim 1 wherein the aesthetically appealing augmentation of the silver-toned reflected light upon the skin surface occurs when the skin surface predominantly has a Cool skin tone.

4. The personal enhancing color selection system of claim 1 wherein the aesthetically appealing augmentation of the copper-toned reflected light upon the skin surface occurs when the skin surface predominantly has a Rosy skin tone.

5. The personal enhancing color selection system of claim 1 wherein the aesthetically appealing augmentation of the gold-toned reflected light upon the skin surface occurs when the skin surface predominantly has a Warm skin tone.

6. The personal enhancing color selection system of claim 1, wherein a guidance can be provided in the selection of hair colors, makeup colors and clothing colors, based upon the visual determination of said aesthetically appealing augmentation.

7. A method for a personal enhancing color selection, the method comprising the steps of:
   a) placing a selected reflective material proximate to a skin surface, the selected reflective material having a metallic sheen when reflecting an ambient light source, the selected reflective material selected from a group consisting of a silver-hued material, a copper-hued material, and a gold-hued material;
   b) imparting an incident reflected light toward the skin surface from the ambient light source as reflected from the selected reflective fabric material; and
   c) visually determining an aesthetically appealing augmentation to the skin surface, as resulting from the incident reflected light upon the skin surface from the selected reflective fabric.

8. The method for a personal enhancing color selection of claim 7, wherein the skin surface is a facial skin surface.

9. The method for a personal enhancing color selection of claim 7, with the additional step of:
   d) imparting a silver toned reflected light on the skin surface with the silver-hued material.

10. The method for a personal enhancing color selection of claim 7, with the additional step of:
    d) imparting a copper toned reflected light on the skin surface with the copper-hued material.

11. The method for a personal enhancing color selection of claim 7, with the additional step of:
    d) imparting a gold toned reflected light on the skin surface with the gold-hued material.

12. The method for a personal enhancing color selection of claim 8, with the additional step of:
    d) providing guidance in the selection of hair colors, makeup colors and clothing colors.

* * * * *